United States Patent [19]

Rhudy et al.

[11] 3,938,594
[45] Feb. 17, 1976

[54] FRACTURING FLUID

[75] Inventors: John S. Rhudy; Bruce L. Knight, both of Littleton, Colo.

[73] Assignee: Marathon Oil Company, Findlay, Ohio

[22] Filed: Apr. 8, 1974

[21] Appl. No.: 458,740

[52] U.S. Cl. .............................. 166/308; 252/855 R
[51] Int. Cl.$^2$ ......................................... E21B 43/26
[58] Field of Search .................... 166/271, 283, 308; 252/8.55 R, 316

[56] References Cited
UNITED STATES PATENTS

| | | | |
|---|---|---|---|
| 3,163,212 | 12/1964 | Bernard | 166/283 |
| 3,254,719 | 6/1966 | Root | 252/8.55 R |
| 3,302,717 | 2/1967 | West et al. | 166/283 |
| 3,310,112 | 3/1967 | Nielsen et al. | 166/283 |
| 3,336,979 | 8/1967 | Ingraham et al. | 166/283 |
| 3,370,650 | 2/1968 | Watanbe | 166/283 |
| 3,442,803 | 5/1969 | Hoover et al. | 166/308 |
| 3,451,480 | 6/1969 | Zeh et al. | 166/308 |
| 3,537,525 | 11/1970 | Sarem | 166/308 |
| 3,696,035 | 10/1972 | Nimerick | 166/308 |
| 3,704,750 | 12/1972 | Miles et al. | 166/308 |
| 3,727,688 | 4/1973 | Clampitt | 166/308 |
| 3,752,233 | 8/1973 | Sualdi et al. | 166/308 |
| 3,762,476 | 10/1973 | Gall | 166/294 |
| 3,768,566 | 10/1973 | Ely et al. | 166/283 |
| 3,795,276 | 3/1974 | Eilers et al. | 166/294 |
| 3,818,991 | 6/1974 | Nimerick | 166/308 |

*Primary Examiner*—Stephen J. Novosad
*Assistant Examiner*—Jack E. Ebel

[57] ABSTRACT

Improved fracturing of subterranean formations with water-based fracturing fluids is obtained by incorporating into an aqueous fracturing fluid (1) a water-soluble, high molecular weight polymer that will crosslink in the presence of chromic ion and (2) controlled amounts of chromic ion to crosslink the polymer to form a gel of desired viscosity. Useful polymers include partially hydrolyzed polyacrylamide and copolymers of acrylamide and sodium acrylate.

18 Claims, No Drawings

FRACTURING FLUID

BACKGROUND OF THE INVENTION

1. Field of the Invention

This invention relates to hydraulically fracturing subterranean formations having an injection means in fluid communication with the subterranean formation. Fracturing is effected with an aqueous fracturing fluid containing a crosslinked polymer.

2. Description of the Prior Art

The productivity or injectivity of a well or formation may be greatly reduced by contamination with waxy occlusions, casing cement, drilling mud, emulsion blocks, low permeability of the formation rock, etc. These blockages may be overcome by injecting a fluid into a well to hydraulically fracture the formation at a sufficient rate and pressure to overcome the tensile strength of the formation and the overburden pressure. This causes cracks extending from the wellbore out into the formation and permits the flow of hydrocarbons and other liquid and gaseous fluids.

Desirable fracturing fluid properties include stability under formation conditions, high viscosity and low fluid loss and low friction loss during injection into the formation. Crosslinked polymer solutions possess some if not all of these properties.

Patents representative of the prior art include the following:

U.S. Pat. No. 3,542,044 to Hansen et al: Incorporating polyacrylamide having a molecular weight of at least 3,000,000 in a fracturing fluid reduces energy loss during the pumping of the fluid. The polyacrylamide acts as a friction reducing and dispersing agent.

U.S. Pat. No. 3,537,525 to Sarem: Friction loss during pumping is reduced by incorporating an acrylic acid-acrylamide-diacetone acrylamide terpolymer into a fracturing fluid in concentrations up to 500 ppm. The terpolymer provides better friction reduction than is obtained using a partially hydrolyzed polyacrylamide.

U.S. Pat. No. 3,370,650 to Watanabe: A suspension of finely divided particles of water-insoluble, oil-soluble homogeneous solid solution of wax and polymer in an aqueous solution of a partially hydrolyzed, high molecular weight polyacrylamide is used for fracturing. The polyacrylamide has 12–67 percent of the original amide groups hydrolyzed to carboxyl groups.

U.S. Pat. No. 3,254,719 to Root: The pressure drop due to flow of a fracturing fluid is reduced by 0.005-4 weight percent of an acrylamide polymer. The polymer can be a long chain polymer of ethylene oxide having a molecular weight of one to ten million or a copolymer of acrylamide with other monoethylenically unsaturated monomers copolymerizable therewith.

U.S. Pat. No. 2,842,338 to Davis et al: A drilling fluid is obtained by the in situ crosslinking of polyacrylic acid with a polyvalent cation.

SUMMARY OF THE INVENTION

We fracture a subterranean formation with aqueous fracturing fluids comprising incorporating within the fracturing fluid a high molecular weight polymer that will crosslink in the presence of chromic ion, and enough chromic ion to crosslink the polymer. The fracturing fluid may be injected into the formation after gellation of the polymer, or the aqueous polymer solution may be injected prior to or subsequent to the injection of an aqueous solution of chromic ion, to form a polymer gel in situ. The polymer may be present in the fracturing fluid at a concentration of 0.1–3 percent by weight.

PREFERRED EMBODIMENTS OF THE INVENTION

Polymers useful with this invention include any high molecular weight polymers which will crosslink in the presence of chromic ion. The polymers may be homopolymers, copolymers, terpolymers, etc. and chemically modified and/or chemically substituted modifications thereof. Particularly preferred polymers include high molecular weight polyacrylamides having about 10 to about 70 percent carboxyamide groups hydrolyzed to carboxyl groups. Examples of preferred polymers include high molecular weight polyacrylamides marketed under the tradename "Pusher" by Dow Chemical Co., Midland, Michigan, USA; "Uni-Perm" and "HiVis" marketed by Betz Laboratories, Inc., Trevose, Pennsylvania, USA; and "Calgon 454" marketed by Calgon Corp., Pittsburgh, Pennsylvania, USA. Also particularly useful are acrylamide-sodium acrylate copolymers, e.g. the Nalco liquid polymers, marketed by The Petroleum Division, Nalco Chemical Co., Houston, Texas, USA. The polymer may be present in the fracturing fluid at a concentration of about 0.1 to about 3.0 percent, more preferably about 0.2 to about 2.0 percent, and most preferably about 0.25 to about 1.5 percent by weight of the fracturing fluid.

Chromic ion may be incorporated into the fracturing fluid as an aqueous solution of any chromium compound in which the chromium ion is in the +3 or higher valence state capable of being reduced to the +3 valence state upon the addition of a suitable reducing agent, and in which the anion of the chromium compound does not exhibit a detrimental effect upon the fracturing fluid. Suitable chromium salts include $CrCl_3$, $Cr(NO_3)_3$, $K_2Cr_2O_7$, $NaCr_2O_7$, etc. The preferred chromium salt is $CrCl_3$. The chromium salt may be present in the fracturing fluids in concentrations of about 0.01 to about 1.0 percent or more, more preferably about 0.05 to about 0.8 percent and most preferably about 0.10 to about 0.5 percent by weight of the fracturing fluid.

When placed in an aqueous solution, many powdered polymers tend to clump or agglomerate causing inefficient polymer contact with subsequently added crosslinking agent. A semipolar organic dispersing agent such as isopropyl alcohol can reduce the problem. In practice, the polymer may be slurried into an aqueous solution of the dispersing agent prior to the addition of the crosslinking agent. The dispersing agent may be present in concentrations of about zero to about 10 percent, more preferably 0.5 to 5 percent, and most preferably 1 percent to about 3 percent by weight of the fracturing fluid.

When the polymer of the present invention is crosslinked with the chromium ion gelling agent, an extremely viscous solution is obtained. The viscosity may prevent pumping of the fracturing fluid into the wellbore at sufficient pressure to fracture the formation. Therefore it is preferable to inject an aqueous polymer solution into the formation and subsequently inject an aqueous solution of the chromium ion, or, to inject the crosslinking agent solution into the formation prior to injection of polymer solution. The polymer gel is thereby formed in situ. The viscosity of the gel may be controlled by varying the concentrations of the crosslinking agent and polymer.

The fracturing fluid is preferably prepared at the injection site and used within a few hours of makeup. Therefore it may be unnecessary to include additives common to other fracturing fluids, e.g. corrosion inhibitors, bactericides, fluid loss compounds, etc. Slight degradation of the polymer due to the effects of oxygen and bacteria during these short periods of time would not significantly affect its gelling capabilities. Furthermore, the high gel viscosity reduces fluid loss during the fracture treatment. These additives may, however, be incorporated into the fracturing fluid if needed.

The fracturing fluid may be preceded by any prefracturing agents, for example, acids, aqueous acids, and other agents which tend to clean the rock face or the formation and permit a more efficient fracturing process. Also, diverting agents may be intermittently injected while injecting the fracturing fluid to obtain a more uniform fracturing profile in heterogeneous formations. Examples of useful diverting agents include coal-tar derivatives, sealer balls in a cased well, etc.

The fracturing fluid may also contain propping agents to keep fractures open. Examples of useful propping agents include sand, glass beads, cracked walnut shells, etc.

The fracturing treatment may be followed by displacement of the fracturing fluid out into the reservoir by post-fracturing fluids desirably having the ability to solubilize or chemically degrade the polymer, or otherwise restore permeability to the formation. For example, an aqueous sodium hypochlorite solution, acid, micellar solutions or surfactant-containing fluids may be injected after the fracturing fluid to degrade the polymer and restore permeability to the reservoir rock.

The following examples teach specific embodiments of the invention. Equivalent modifications will be obvious to one skilled in the art and are intended to be included within the scope of appended claims. Unless otherwise specified, percentages are based upon weight of the fracturing fluid, and the properties of the fracturing fluid are measured at ambient temperature.

EXAMPLE I

To demonstrate the improved results obtained by using chromic ion as a crosslinking agent, the properties of an aqueous polyacrylamide solution crosslinked with $Cr^{+++}$ are compared with aqueous polyacrylamide solutions gelled with other polyvalent cations. The viscosities of 1.0 percent aqueous solutions of Dow Pusher 700 polymer (a high molecular weight, partially hydrolyzed polyacrylamide marketed by Dow Chemical Co., Midland, Michigan, USA) gelled in an aqueous solution of 0.1 percent polyvalent cation salts is shown in Table 1.

Table 1

| Viscosity of Gelled Polyacrylamides | |
|---|---|
| Crosslinking Agent | Viscosity |
| None | 4,680 |
| $FeCl_3$ | 4,715 |
| $CaCl_2$ | 5,180 |
| $AlCl_3$ | 7,810 |
| $CrCl_3$ | 44,240 |

Only slight viscosity increases are obtained by gelling the polyacrylamide with ferric, calcium, and aluminum cations. Chromium cations, however, cause a tenfold increase in viscosity. The polymer solutions containing the calcium and chromium are uniform, whereas the polymer solutions containing ferric and aluminum salts are highly heterogeneous.

EXAMPLE II

A fracturing fluid is prepared by slurrying a 1.0 percent aqueous solution of Dow Pusher 700 polymer in a 2.0 percent aqueous solution of isopropyl alcohol. The resulting slurry is mixed in distilled water containing 0.1 percent chromic chloride (all percents based upon weight of the final solution). Fifteen gallons of 12-mesh glass beads are added per 1,000 gallons of aqueous solution. The fracturing fluid is injected into a 25 foot section sandstone formation in Crawford County, Illinois, USA, through an injection well at 900 psig surface pressure and 0.15 bbls/minute to fracture the surrounding formation rock. The fracture treatment provides improved fluid injectivity.

What is claimed is:

1. A process for fracturing a subterranean formation penetrated by at least one injection well wherein an aqueous fracturing fluid comprised of a high molecular weight polyacrylamide polymer is injected into the formation, the steps comprising injecting into the formation at sufficient rate and pressure to fracture the formation an aqueous solution of a high molecular weight polyacrylamide polymer that is gelled in the presence of chromic ion prior to injection of the polymer into the formation.

2. The process of claim 1 wherein the polymer is a partially hydrolyzed polyacrylamide.

3. The process of claim 1 wherein the polymer is a copolymer of acrylamide and sodium acrylate.

4. The process of claim 1 wherein the concentration of the polymer is about 0.1 percent to about 3.0 percent by weight of the fracturing fluid.

5. The process of claim 1 wherein the chromic ion is incorporated into the fracturing fluid as an aqueous solution of a chromium salt.

6. The process of claim 5 wherein the concentration of the chromium salt is about 0.01 percent to about 0.5 percent by weight of the fracturing fluid.

7. The process of claim 1 wherein the fracturing fluid includes a propping agent.

8. The process of claim 1 wherein the polymer is slurried in a dispersing agent prior to injection of the polymer solution into the formation.

9. The process of claim 8 wherein the dispersing agent is isopropyl alcohol.

10. A process of fracturing a subterranean formation penetrated by at least one injection well wherein an aqueous fracturing fluid comprised of a water soluble, high molecular weight polyacrylamide polymer is injected into the formation, the steps comprising injecting into the formation at sufficient rate and pressure to fracture the formation an aqueous solution comprised of about 0.1 to about 3.0 percent by weight of a polyacrylamide polymer that has been gelled in the presence of about 0.01 to about 1 percent by weight of chromic ion.

11. The process of claim 10 wherein the polymer is a partially hydrolyzed polyacrylamide.

12. The process of claim 10 wherein the polymer is a copolymer of acrylamide and sodium acrylate.

13. The process of claim 10 wherein the concentration of the polymer is about 0.25 to about 1.5 percent by weight of the aqueous solution.

14. The process of claim 10 wherein the concentration of the chromium salt is about 0.10 to about 0.5 percent by weight of the aqueous solution.

15. The process of claim 10 wherein the chromium salt is $CrCl_3$.

16. The process of claim 10 wherein the valence of the chromium in the chromium salt is greater than +3 and wherein the aqueous solution further comprises a reducing agent to reduce the chromium to the +3 valence state.

17. The process of claim 10 which further comprises slurrying the polymer in a dispersing agent prior to injecting the polymer solution into the formation.

18. The process of claim 17 wherein the dispersing agent is an aqueous solution of isopropyl alcohol.

* * * * *